W. C. HICKS.
Breech Loading Fire Arm.
No. 3,798.
Reissued Jan'y 18, 1870.
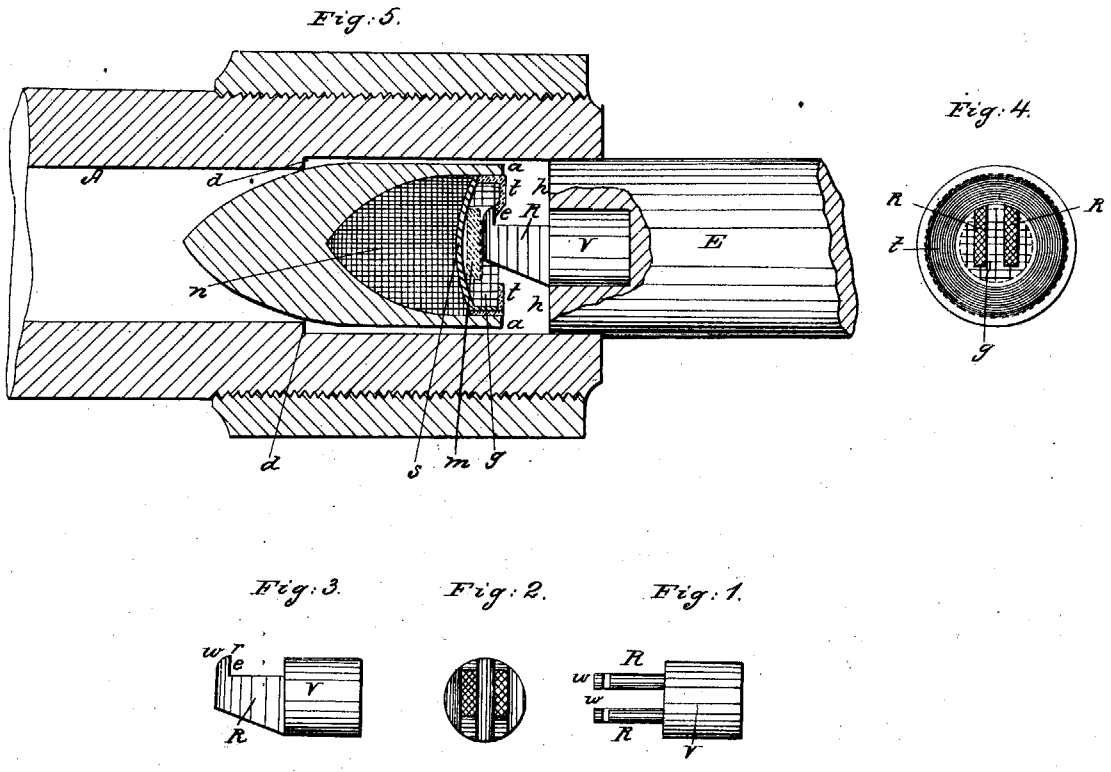
Witnesses:
J. L. Coombs.
Jno. D. Patten.
Inventor:
Wm Cleveland Hicks.
By J. J. Coombs.
Attorney.
N. PETERS. Photo-Lithographer, Washington, D. C.

UNITED STATES PATENT OFFICE.

WILLIAM CLEVELAND HICKS, OF SUMMIT, NEW JERSEY.

IMPROVEMENT IN BREECH-LOADING FIRE-ARMS.

Specification forming part of Letters Patent No. 16,797, dated March 10, 1857; Reissue No. 1,952, dated May 9, 1865; Reissue No. 3,798, dated January 18, 1870.

*To all whom it may concern:*

Be it known that I, WILLIAM CLEVELAND HICKS, formerly of New Haven, in the State of Connecticut, now of Summit, in the State of New Jersey, made an invention of new and useful Improvements in Fire-Arms; and I do hereby declare that the following is a full, clear, and exact description and specification of the same.

The object of my invention is primarily to extract from the breech of a fire-arm the cartridge or the remnant thereof which remains after firing, and secondarily to insure the explosion of the percussion-primer.

To this end my invention consists of certain combinations and arrangements of one or more extracting-hooks and the chamber in the breech of a fire-arm in which the cartridge is received. These combinations are specified at the close of this schedule.

My invention is applicable to breech-loading fire-arms of various constructions; and in order that it may be fully understood I may refer to a pistol manufactured at the time of my invention by the Volcanic Repeating-Arms Company, with my improvements applied thereto, said pistol being in other respects substantially the same as that described in the patent granted to Horace Smith and D. B. Wesson the 14th day of February, A. D. 1854. I will describe also such parts of said pistol as are important to a clear understanding of my invention.

Figures 1 to 5, inclusive, represent views of parts of the pistol detached from the residue and considerably enlarged.

The said pistol has a barrel, A, which is constructed to be loaded at the breech with a cartridge—such as is represented at Figs. 4 and 5—having at its butt an internal brass flange, *t*, which, being elastic, yields, when pushed forward by an inclined instrument, and tends to regain its original form when the instrument has passed by it. The percussion-primer *m* has the form of a cake, which is supported, near the powder *n*, by a steel disk, *s*, and is covered by a thin disk of cork, *g*. The barrel A of the pistol has an enlarged chamber, *h*, at its rear end, for the reception of the cartridge, the chamber being deep enough to receive within it the entire cartridge, including its flange *t*. The cartridge is pushed into the chamber by means of the breech-pin E, operated by means of a lever, for the purpose of moving said breech-pin and its connections to and fro. The pistol is fired by the operation of a hammer, which is arranged to operate through the breech-pin and its appurtenances upon the primer in the cartridge.

The construction of the cartridge and the mode of firing it being such as above stated, my improvements were applied to the pistol in the mode represented in the accompanying drawings, as follows: The extracting-hook R is applied to the forward end of the breech-pin, and is in this case used as the striking-instrument for striking the percussion-primer *m* in addition to performing its function of extracting the cartridge. Moreover, two hooks, R R, were used, forming in this example two striking-instruments. As the flange *t* of the cartridge used with the pistol is made of elastic metal, which will yield to permit the hooks to pass by it, they are made rigid by being formed upon a cylindrical plug or stock, V, and are connected with the breech-pin by driving said stock V into a socket formed in the front end of the breech-pin. As the breech-pin is connected with a lever, the extracting-hooks, being connected with the breech-pin, are combined with said lever, so that when the lever is turned in one direction the extracting-hooks are moved forward, and when the lever is moved in the opposite direction the extracting-hooks are withdrawn. Each extracting-hook is so arranged relatively to the cartridge-chamber that the bill *w* of the hook, when advanced, enters within the periphery of the cartridge-chamber *h*, so as to be sure to engage with the flange of the cartridge therein. Each hook also is so arranged relatively to the cartridge-chamber that the bill *w* of the hook when moved to its most forward position is in advance of the rear (*a a*, Fig. 5) of the space occupied by the cartridge, at least as far as the thickness of the flange thereof, so that the shoulder *e* of the hook may engage with certainty with the forward side of the cartridge-flange. Moreover, although two hooks are used, each is arranged to act at one side only of the flange of the cartridge, their bills both pointing in the same direction, so that when the cartridge is withdrawn from the chamber it may readily be disengaged from the bill of the hook by moving the cartridge in the plane of the profile of the hook, which could not readily be done if two hooks (when two are used) were arranged at opposite sides of the cartridge-flange, so as to hold the cartridge between them.

When the pistol is to be loaded, the movement of the lever opens the breech and withdraws the extracting-hooks, while the movement of the lever in the opposite direction first impels the cartridge into the chamber of the breech. When, however, the cartridge reaches the shoulder *d* at the front end of the chamber, its forward movement is stopped, and then the continued movement of the lever impels the extracting-hooks forward past the edge of the flange *t;* and, as the point of each is inclined or sloped off in advance of its shoulder, the hook readily passes over the edge of the flange, which, being of thin metal, yields to the pressure of the hook. When the shoulder of the hook has passed by the edge of the flange *t*, the latter, being elastic, tends to resume its original position, and the shoulder of the hook engages with the flange, so that if the lever be then moved to open the breech, the hooks will extract the cartridge by reason of their engagement with its flange.

In the volcanic fire-arm referred to the construction of the cartridge with a thin flexible flange permits the extracting-hook to be rigidly secured to the breech-pin; but this feature is not claimed as a peculiarity of the invention.

The construction of the cartridge with the primer arranged in its interior in the line of movement of the point of the extracting-hook after passing the flange, enables the hook to be used as the striking-instrument for transmitting the blow of the hammer to the primer *m*, although this use of the hook does not affect in any manner its operation in extracting a cartridge and is not essential to it.

The reason why two striking-instruments are used, and are an improvement upon one, is as follows: When a single striking-instrument is used, the cake of percussion-powder forming the primer being struck at about its center, frequently splits into parts and allows the striking-instrument to pass forward between the parts without striking them against the disk-support of the primer; hence the fire-arm frequently fails to discharge; but two striking-instruments will hold some portion of the cake between their points, so that it cannot escape, and consequently some portion of it is certain to be struck between the points of the striking-instruments and the disk-support, and the fire-arm is sure to fire.

The parts of the pistol represented in the drawings which I have not described are the same in construction and operation as the corresponding parts of the pistol described in said patent of Smith and Wesson of 14th February, A. D. 1854, and manufactured by the Volcanic Repeating Arms Company, as previously referred to by me. In that fire-arm two extracting-hooks were used; but they were so arranged that when advanced their bills were outside of the periphery of the cartridge and of the chamber in which it was received. Consequently, they could not engage with the cartridge-case unless its butt were first expanded by the blow of the striking-instrument; hence the loaded cartridge could not be withdrawn by the hooks, and the latter could be used only to extract an expanded and empty cartridge-case. As the bill of my extracting-hook, when moved forward, is within the periphery of the cartridge-chamber and within the space occupied by the cartridge-flange, it must of necessity engage with the cartridge-flange whether the cartridge has been fired or not, and consequently can be used to withdraw a loaded cartridge.

Having thus described my improvements, I claim as my invention and desire to secure by Letters Patent—

1. The combination and arrangement, substantially as set forth, of the cartridge-chamber (in the barrel of the fire-arm) and the reciprocating hook in such manner that the bill of the hook enters within the periphery of the said chamber, so that it may engage with the flange of the cartridge therein whether the same be expanded or not.

2. The combination and arrangement, substantially as set forth, of the said cartridge-chamber and the reciprocating hook in such manner that the bill of said hook, when in its forward position, is both within the periphery of the said chamber and in advance of the rear of the space in which the cartridge is received, so that it may engage with the front side of the flange of the cartridge when the latter is inside of said space.

3. The combination and arrangement, substantially as set forth, of the extracting-hook described with the breech of the fire-arm in such manner that but one side only of the flange of the cartridge is engaged with a hook inside of the cartridge-chamber, thereby enabling the cartridge-case to be readily disengaged from the extracting-hook.

4. The combination and arrangement, substantially as set forth, of the hook with the breech-pin of the fire-arm in such manner that the said hook performs the two functions of transmitting a blow to the primer and of extracting the cartridge-case from the breech of the fire-arm.

In testimony whereof I have hereto set my hand this 3d day of December, A. D. 1869.

WM. CLEVELAND HICKS.

Witnesses:
WEMT. P. CURTIS,
JAS. M. HICKS.